United States Patent Office 3,836,556
Patented Sept. 17, 1974

3,836,556
SYNERGISTIC METAL SEQUESTRANT
Ronald H. Carlson, Lewiston, N.Y., assignor to Hooker Chemical Corporation, Niagara Falls, N.Y.
No Drawing. Original application July 13, 1970, Ser. No. 54,663, now Patent No. 3,734,861. Divided and this application Apr. 21, 1972, Ser. No. 246,489
The portion of the term of the patent subsequent to May 18, 1988, has been disclaimed
Int. Cl. C05d 9/02; A01n 7/00
U.S. Cl. 260—439 R          3 Claims

ABSTRACT OF THE DISCLOSURE

Mixtures of tris(hydroxymethyl)phosphine oxide, and tris(N-acetoaminomethyl)phosphine as well as the alkali metal salts thereof, exhibit marked synergism as sequestrant compositions over a broad pH range. The sequestrant compositions are useful as additives for detergents, metal cleaning baths, peroxide compositions and dyes. The chelate products are useful in the field of agriculture for the introduction of trace elements into plant life and especially in the treatment of iron chlorosis in plants.

RELATED APPLICATIONS

This is a division of application Ser. No. 54,663, filed July 13, 1970, now U.S. Pat. 3,734,861.

This application is a continuation-in-part of Ser. No. 680,011, filed Nov. 2, 1967.

BACKGROUND OF THE INVENTION

The invention relates to synergistic sequestrant mixtures, their use and the chelated products thereof.

The use of complexing agents which combine with metal ions in solution to form soluble complexes (which agents are commonly referred to as sequestrants) is of great importance in many industrial processes inasmuch as it may prevent undesired precipitation reactions from occurring. For example, sequestration of calcium is important in water treatment and in laundry solutions for controlling hardness of the water. Sequestration of the heavy metals such as copper and nickel is essential in such areas as textile processing and metal cleaning and finishing. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

The commercial utilization of water-soluble chelating compounds in agricultural applications to provide trace elements for plant growth is well known. Likewise, the treatment of plants suffering from chlorosis as a result of growth in alkaline soils devoid of sufficient assimilatable iron is known. Various chelating agents have been employed in the past to correct iron deficiencies in plants, the water solubility of chelated metal ions affords the primary route for potential assimilation into a plant structure.

Ethylenediaminetetraacetic acid (EDTA) has been employed in the past for treatment of iron deficiencies of citrus trees under acid conditions. The EDTA iron chelates are not stable in neutral and alkaline media. The development of sequestrants which may be employed in acid media as well as alkaline media is significant not only for agricultural applications, but for use in the detergent field, metal cleaning field, textile and dye industry and as stabilizers for organic and inorganic peroxides.

SUMMARY OF THE INVENTION

In accordance with the instant invention, there is provided compositions of matter comprising tris(hydroxymethyl)phosphine oxide and a member selected from the group consisting of tris(N-acetoaminomethyl)phosphine, and the alkali metal salts thereof, in mole ratio of about 10/90 to 90/10.

Furthermore, in accordance with the instant invention, there is provided a process for sequestering metal ions from aqueous solution over a pH range of about 4 to 10 by reacting the sequestrant mixture of this invention with metal ions.

Also, this invention provides novel compositions of matter comprising the sequestered metal ion derivatives of the sequestrant mixtures of this invention.

DETAILED DESCRIPTION OF THE INVENTION

Mixtures of tris(hydroxymethyl)phosphine oxide (THPO) and tris(N - acetoaminomethyl)phosphine (TAMP), and its alkali metal salts unexpectedly display marked synergistic action as a sequestrant composition in mole ratios within the range from about 10/90 to 90/10, generally at a pH of from 4 to 10.

The metal ions which may be sequestered by the composition of this invention are those cations having a valence of two or more, such as the ions of chromium, copper, nickel, tin, aluminum, cobalt, platinum, palladium, rhodium, iridium, ruthenium, osmium, zirconium hafnium, the rare earths such as gadolinium, europium, neodymium, the actinides such as uranium, and especially iron in the ferric ($Fe^{+3}$) state.

The tris(hydroxymethyl)phosphine oxide component of the synergistic sequestrant mixture need not be introduced into an aqueous system for containing metal cations as such, because it may be formed in situ in known manner from various known precursors, such as tris(hydroxymethyl)phosphine and tetrakis(hydroxymethyl)phosphonium halide. Generally, at a pH above 7, the tetrakis (hydroxymethyl)phosphonium salts are converted to the corresponding tris(hydroxymethyl)phosphine which undergoes oxidation to produce the phosphine oxide.

The tris(N-acetoaminomethyl)phosphine component of the sequestrant mixtures of this invention is preferably employed as its sodium (STAMP) or potassium (KTAMP) salt to increase water solubility.

The synergistic action of the sequestrant composition of this invention varies with the pH of the aqueous system as well as with the mole ratio of the components in the mixture. With mole ratios of tris(hydroxymethyl) phosphine oxide to tris(N-acetoaminomethyl)phosphine between 10/90 to 50/50, the synergistic sequestrant action toward the ferric ion is evident at pH values from about 4 to 8, whereas with mole ratios from about 50/50 to 90/10, the synergistic activity is extended into the pH range from about 7 to 9 and, with the 90/10 mole ratio of reactants, into the pH 10 region.

The composition of this invention, when added to those solutions in which sequestration is desired, may be added as a solid or as a solution. If it is desired to add said composition as a solution, the composition may be dissolved in water. From about 0.001 percent to about 50 percent concentration (by weight) may be used, though it is preferred to use from about 0.01) to about 5 percent concentration (by weight), and it is even more preferred to use from about 0.1 to about 3 percent concentration (by weight).

It is preferred to use said compositions as sequestrants in aqueous solutions. When said composition is added to the solution containing metal ions to be sequestered, the temperature of said solution may be from about 0 to about 100 degrees centigrade, though it is preferred that said temperature be from about 20 to about 70 degrees centigrade, and it is even more preferred that said solution be at ambient temperature.

The sequestrant mixture of this invention may be formulated either as an aqueous solution containing the two components in the desired ratio or as a solid mixture.

The sequestered iron chelate may also be employed as an aqueous solution or as a solid. The ferric iron chelate is soluble in aqueous alkaline solution in an amount exceeding 20 percent by weight, and contains more than 10 percent iron on a weight basis. Thus, when compared to the ferric iron chelate of EDTA, which contains a relatively low percentage of iron, 5–10 percent by weight, and which exhibits low solubility in alkaline solution, the sequestrant mixture of this invention presents decided advantages.

The solid ferric ($Fe^{+3}$) iron chelates of this invention are of the general composition $$Na_n[Fe_x(THPO)_y(TAMP)_z]$$

in which $n$, $x$, $y$ and $z$ are numbers greater than 0, and may be prepared by mixing apropriate amounts of ferric chloride, sodium hydroxide, tris(hydroxymethyl)phosphine oxide (THPO) and tris(N-acetoaminomethyl)-phosphine (TAMP) or a salt thereof in aqueous solution. After the reaction is complete, the solid chelate may be forced from solution by addition of a lower alkanol, such as ethanol or isopropanol. The isolated chelate is then dried and ground into a free-flowing brown powder.

EXAMPLE 1

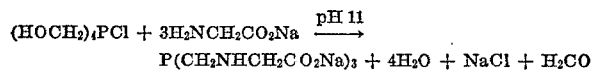

$$(HOCH_2)_4PCl + 3H_2NCH_2CO_2Na \xrightarrow{pH\ 11}$$
$$P(CH_2NHCH_2CO_2Na)_3 + 4H_2O + NaCl + H_2CO$$

Trisodium tris(N - acetatoaminomethyl)phosphine was prepared by the dropwise addition of 61 grams of aqueous solution containing 29.92 grams (0.157 moles) of dissolved tetrakis(hydroxymethyl)phosphonium chloride (THPC), with stirring, to 172 grams of an aqueous solution containing 34.45 grams (0.459 moles) of dissolved glycine at pH 11. During the addition of THPC to the glycine solution, the pH of the reaction solution was maintained at pH 11 by the addition of 6 molar NaOH. An increase in the reaction solution temperature of 14° C. (from 25 to 39° C.) was observed during the course of the THPC addition. A yellow-orange solution was obtained upon completion of the THPC solution addition. The reaction solution was stirred for an additional 45 minutes to ensure complete reaction. Acetone was added to the aqueous reaction solution to obtain a two phase system (an upper organic layer and a lower aqueous, oily layer). The layers were separated by decantation and additional acetone was added to the lower layer followed by successive decantations until a solid granular white mass was obtained. This material was vacuum dried over $P_2O_5$ at 25° C. to yield a free-flowing white powder. Yield: 60.7 grams (100% of theory)

*Elemental analysis.*—Calcd. for $$P(CH_2NHCH_2CO_2Na)_3 \cdot H_2O$$

(percent): P, 8.18; C, 28.50; H, 4.52; Na, 18.20. Found (percent): P, 7.50; C, 28.99; H, 4.42; Na, 18.22. The formation of STAMP was further suported by infrared and nuclear magnetic resonance spectroscopic data.

EXAMPLE 2

Tris(N-acetoaminomethyl)phosphine is prepared by treating an aqueous solution of the trisodium salt with 3 equivalents of HCl to form the protonated product.

EXAMPLE 3

The ferric ($Fe^{+3}$) iron chelate of THPO and STAMP is prepared by adding an aqueous solution containing tris(hyroxymethyl)phosphine oxide and trisodium tris-(N-acetatoaminomethyl)phosphine in the desired mole ratio to an aqueous solution containing ferric ions. Sufficient sodium hydroxide is added to adjust the pH of the solution to 7. A clear, yellow to brown colored solution will form which is removed from any precipitated solid material by decantation. The solid ferric iron chelate is then forced from solution by the addition of a lower alkanol (ethanol, isopropanol, and the like) to the aqueous solution of the chelate to form a two-phase system. The phases are separated by decantation and the lower chelate containing phase is evaporated to dryness in vacuum at an elevated temperature (about 50° C.). After drying, a finely divided, free-flowing powder is obtained.

EXAMPLE 4

The sequestering efficiency of the sequestrant mixtures of this invention as well as the individual sequestrants were determined by titrating an aqueous solution 0.5 molar in $FeCl_3$ dropwise into a stirred 50 gram aqueous solution containing 0.5 gram of dissolved sequestrant until the end point was reached as observed by a perceptible permanent haze in the solution. The pH of the solution of dissolved sequestrant was initially adjusted to the desired point and maintained at the specified pH during the titration by addition of aqueous sodium hydroxide as needed to control the hydrogen ion concentration.

The sequestering efficiency was then calculated in terms of the pounds of ferric ion sequestered per 100 pounds of sequestrant. A sequestering efficiency designation of 1.00 represents 7.1 pounds of ferric ion sequestered by 100 pounds of sequestrant.

The data presented in Table I compare the sequestering efficiency of tris(hydroxymethyl)phosphine oxide (THPO) and trisodium tris(N-acetatoaminomethyl)-phosphine (STAMP) and mixtures of these two sequestrants in the ratios indicated at the stated pH, for ferric ion. The mole ratio of the components of the synergistic sequestrant mixture is within the range from 10/90 to 90/10.

TABLE I

| pH | THPO | Stamp | THPO/STAMP 10/90 | THPO/STAMP 50/50 | THPO/STAMP 90/10 |
|---|---|---|---|---|---|
| 4  | 0.4  | 0.5 | 1.1 | 1.2 | 0.9 |
| 5  | 0.3  | 0.6 | 0.8 | 1.0 | 0.6 |
| 6  | 0.2  | 0.7 | 0.8 | 0.9 | 0.6 |
| 7  | 0.2  | 0.5 | 0.7 | 3.4 | 0.8 |
| 8  | 0.1  | 0.6 | 0.9 | 1.9 | 2.4 |
| 9  | 0.4  | 0.2 | 0.4 | 1.6 | 3.1 |
| 10 | 3.6  | 0.1 | 0.4 | 3.0 | 4.0 |
| 11 | 10.1 | 0.1 | 0.6 | 4.5 | 8.9 |
| 12 | 19.7 | 0.1 | 0.5 | 4.6 | 9.4 |

It is clear from the data presented in Table I that mixtures of tris(hydroxymethyl)phosphine oxide and trisodium tris(N-acetatoaminomethyl)phosphine exhibit synergistic activity in the sequestration of the ferric ion at a pH value from about 7–8 for the compound mixtures in mole ratio from about 10/90 to 90/10, while at pH values from about 4–7, the synergistic activity is found in the mole ratio range from about 10/90 to 50/50, and at pH values from about 8–9 the synergistic activity is exhibited in the mole ratio range from 50/50 to 90/10, extending in the 90/10 mixture to a pH value of about 10.

To further place the instant invention in perspective, the sequestering efficiencies of several known sequestrants for the ferric ion are presented in Table II. The abbreviations employed are as follows:

Trisodium nitrilotriacetate—SNTA
Disodium iminodiacetate—SIDA
Sodium tripolyphosphate—STPP
Tetrasodium ethylenediaminetetraacetate—SEDTA
Gluconic acid
Trisodium hydroxyethylethylenediaminetriacetate—SHEDTA
Pentasodium nitrilotrimethylene phosphonate—SNTMP
Pentasodium diethylenetriaminepentaacetate—SDTPA

TABLE II

| Sequestrant | Sequestering efficiency | | | | | | | | |
|---|---|---|---|---|---|---|---|---|---|
| | pH4 | pH5 | pH6 | pH7 | pH8 | pH9 | pH10 | pH11 | pH12 |
| SIDA | 0.7 | 0.6 | 0.5 | 0.7 | 1.0 | 1.0 | 1.0 | 0.5 | 0.2 |
| SNTA | 3.2 | 2.1 | 1.4 | 1.1 | 1.0 | 0.8 | 0.7 | 0.3 | 0.1 |
| STPP | 1.7 | 1.0 | 0.9 | 0.6 | 1.2 | 1.5 | 1.2 | 0.6 | 0.2 |
| SEDTA | 1.0 | 1.8 | 1.1 | 0.9 | 1.4 | 1.3 | 1.0 | 0.5 | 0.1 |
| Gluconic acid | | | | 6.0 | 6.6 | 6.7 | 6.8 | 4.5 | 3.2 |
| SHEDTA | | 2.2 | | 2.2 | 2.6 | 2.6 | 2.4 | 1.5 | 0.8 |
| SNTMP | | | | | | | 2.0 | 1.9 | 1.0 |
| SDTPA | | | | 1.3 | 1.3 | 1.6 | 1.9 | 0.9 | 0.5 |

From a comparison of the sequestering efficiencies of the known sequestrants presented in Table II, with the synergistic sequestrant mixture THPO/STAMP presented in Table I, it is apparent that the mixed sequestrant of the instant invention provides completely unexpected activity toward the ferric ion.

What is claimed is:

1. An iron chelate compound prepared by reacting a mixture of tris(hydroxymethyl)phosphine oxide and a member of the group consisting of tris(N-acetoaminomethyl)phosphine and an alkali metal salts thereof in mole ratio of about 10/90 to 90/10 with ferric ions in aqueous solution at a pH from about 4–10, and thereafter recovering said iron chelate compound as a solid product.

2. An iron chelate compound as recited in claim 1 prepared by reacting a mixture of tris(hydroxymethyl) phosphine oxide and a member of the group consisting of tris(N-acetoaminomethyl)phosphine and an alkali metal salt thereof in a mole ratio of about 10/90 to 50/50 with ferric ions in an aqueous solution at a pH from about 4–8.

3. An iron chelate compound as recited in the claim 1 prepared by reacting a mixture of tris(hydroxymethyl) phosphine oxide and a member of the group consisting of tris(acetoaminomethyl)phosphine and an alkali metal salt thereof in a mole ratio of about 50/50 to 90/10 with ferric ions in an aqueous solution at a pH from about 7–9.

References Cited
UNITED STATES PATENTS

| | | | |
|---|---|---|---|
| 3,734,861 | 5/1973 | Carlson | 252—180 |
| 3,661,953 | 5/1972 | Carlson | 260—439 R |
| 3,578,708 | 5/1971 | Carlson | 260—534 |
| 3,499,842 | 3/1970 | Carlson | 252—180 |
| 3,477,953 | 11/1969 | Carlson | 252—175 |
| 2,943,100 | 6/1960 | Holstein | 260—429 |

LEON D. ROSDOL, Primary Examiner

D. L. ALBRECHT, Assistant Examiner

U.S. Cl. X.R.

71—1, Digest 2; 252—180